United States Patent
Keskar (10) Patent No.: US 11,586,612 B2
(45) Date of Patent: Feb. 21, 2023

(54) SYSTEM AND METHOD FOR INTERMEDIARY-LESS DATABASE MANAGEMENT

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 347 days.

(21) Appl. No.: 16/583,973

(22) Filed: Sep. 26, 2019

(65) Prior Publication Data
US 2020/0104297 A1  Apr. 2, 2020

Related U.S. Application Data

(60) Provisional application No. 62/739,273, filed on Sep. 30, 2018.

(51) Int. Cl.
| | | |
|---|---|---|
| *G06F 16/23* | (2019.01) | |
| *G06F 16/22* | (2019.01) | |
| *G06F 21/60* | (2013.01) | |
| *G06F 9/451* | (2018.01) | |
| *G06F 16/27* | (2019.01) | |
| *G06F 16/13* | (2019.01) | |
| *H04L 9/06* | (2006.01) | |
| *H04L 9/00* | (2022.01) | |

(52) U.S. Cl.
CPC ......... *G06F 16/2379* (2019.01); *G06F 9/451* (2018.02); *G06F 16/134* (2019.01); *G06F 16/2282* (2019.01); *G06F 16/27* (2019.01); *G06F 21/602* (2013.01); *H04L 9/0637* (2013.01); *H04L 9/0643* (2013.01); *H04L 9/50* (2022.05)

(58) Field of Classification Search
CPC .... G06F 16/2379; G06F 9/451; G06F 16/134; G06F 16/2282; G06F 16/27; G06F 21/602; G06F 16/21; G06F 21/604; G06F 21/64; H04L 9/0637; H04L 9/0643; H04L 2209/38; H04L 9/3239; H04L 9/50
See application file for complete search history.

(56) References Cited

U.S. PATENT DOCUMENTS

| | | | |
|---|---|---|---|
| 2019/0147086 A1* | 5/2019 | Pal | G06F 16/2471 707/718 |
| 2019/0156332 A1* | 5/2019 | Christidis | H04L 9/14 |
| 2019/0179939 A1* | 6/2019 | Govindarajan | G06F 11/1474 |
| 2019/0305932 A1* | 10/2019 | Townsend | H04L 9/3265 |
| 2020/0007544 A1* | 1/2020 | Wang | H04L 9/3297 |

OTHER PUBLICATIONS

R3, What is a smart contract?, p. 1 (Year: 2017).*

* cited by examiner

*Primary Examiner* — Albert M Phillips, III
(74) *Attorney, Agent, or Firm* — Ziegler IP Law Group, LLC (57) ABSTRACT

Disclosed herein is a system and method for enabling creating and managing structured tables on a blockchain thereby facilitating retrieval of data records with standard database operational commands and in a structured manner. Creating structured tables as per a defined schema provides for data storage in a manner which enables easy integration with existing business applications. Further, the system and method provides for storing unstructured data records in a structured manner in the blockchain.

16 Claims, 6 Drawing Sheets

Fig. 1

| S. No. | User Selection | Input Block | Type Identifier |
|---|---|---|---|
| 1 | Retrieve Data (202) | Query Data (204) | DML (206) |
| 2 | Write Data | Insert Data | DML |
| 3 | Create new repository | Create Table | DDL |
| 4 | Delete Table | Drop Table | DDL |
| 5 | Modify Records | Alter Table | DDL |
| 6 | Update Records | Update Table | DML |
| 7 | Grant Access | Grant | DCL |
| 8 | Revoke Access | Revoke | DCL |
| 9 | Undo Transaction | Rollback | TCL |
| 10 | Commit | Commit | TCL |

| S. No. | User | Table Name | Privilege Level |
|---|---|---|---|
| 1 | Researcher A 302 | P_data 304 | DDL, DML 306 |
| 2 | Researcher B | P_data | DML |
| 3 | Researcher C | P_data | DDL |
| 4 | Researcher D | P_data | DDL, DCL, DML, TCL |

SYSTEM AND METHOD FOR INTERMEDIARY-LESS DATABASE MANAGEMENT

CROSS REFERENCE TO RELATED APPLICATIONS

This application claims priority to U.S. Provisional Patent Application No. 62/739,273, filed Sep. 30, 2018, which is hereby incorporated by reference in its entirety.

TECHNICAL FIELD

The present application relates generally to the field of data processing and particularly to creating and managing data, in a structured manner, on a blockchain. Moreover, the present invention relates to storing, querying and updating of data records on a blockchain.

BACKGROUND

Database Management Systems (DBMS) generally use relational techniques for storing and retrieving data. Data is stored in a database according to a defined database schema, which specifies the pattern of data storage. Any database will typically have data stored in a structured fashion. Databases have been helping businesses to obtain valuable new business insights by using methods for storing, accessing and viewing data in a structured form that supports combinations, re-combinations, or analyses of both existing data elements and structures, combinations, or relations of said data elements. Databases, in addition to having a defined data structure are optimised for faster query processing; but are not resistant to data modifications. Recently, more and more businesses are using blockchain to decentralize their applications (to make it intermediary free and secure from unauthorized data modifications) and as a result more transaction data is being added to the blockchain. While block chain provides extreme levels of security by removing intermediary in data processing, users face problems in data processing including querying and retrieval of data records, since blockchain doesn't store and allow querying of data records in a structured manner due to absence of data definition language in blockchain. Hence, one of the limitations of blockchain is its inherent deficiency in search query processing primarily due to the linked data storage and the absence of a well-defined data indexing structure for various queries. Presently, in order to aggregate and query data records from the blockchain, each of the one or more transactions on the plurality of blocks of a blockchain are processed. The transactions comprise information in raw format and not in a structured manner. Hence, in return for enhanced security, selectively querying and updating data from and to the stored blocks on the blockchain is restricted. Further, said technical challenge restricts the application of blockchain for direct integration with one or more business applications configured for structured data querying. Furthermore, direct analytics on data stored in one or more transactions within a block of a blockchain is currently not supported.

One of the commonly used methods for querying data records stored on blockchain is fetching all the data records stored in the one or more transactions added to the plurality of blocks of the blockchain. The fetched data records are stored on an external database, separate from the blockchain, with defined schema and querying the external database for retrieval of data records in a structured manner.

The abovementioned method of querying data records stored on a blockchain results in large amount of data exchange with the intermediary platform which is time consuming and inefficient. Further, such method of data extraction from the blocks of the blockchain platform is against the spirit of blockchain which strives to make information processing and management intermediary free. Hence, use of external database for querying data records in a structured manner eliminates all advantages associated with a blockchain.

In light of the above-mentioned shortcomings associated with existing methods and systems for querying of data records stored on blockchain platform, it is highly desirable to have a system and method that allows data records, added to blocks on a blockchain, to be stored in a structured manner with a defined data schema.

The present invention, as described below, allows enable real time creation and management of structured repositories so that any new data record that gets added via new transaction blocks can be structured for easy retrieval and management.

SUMMARY

Embodiments of the present disclosure present technological improvements as solutions to one or more of the above-mentioned technical problems recognized by the inventor in conventional systems.

In an aspect of the present invention, a system and method of structured data management on a blockchain is provided.

In another aspect of the present invention, a system and method for creating and managing structured repositories the on a blockchain is provided.

In another aspect of the present invention, a system and method for storing of data records in a structured manner is provided.

In another aspect, a system and method for querying of data records, stored on the blockchain, in a structured manner is provided.

In yet another aspect, the present invention provides implementation of data definition languages on blockchain.

Beneficially, the present invention provides a method of structured data management on a blockchain, the method comprising:
  selecting, via a user interface, at least one database function element;
  receiving, via the user interface, one or more user inputs consistent with the selected database function;
  appending, to the blockchain, an input transaction with preconfigured permissions to invoke at least one standard smart contract method on the blockchain wherein the input transaction comprises a first set of parameters corresponding to the one or more user inputs, and wherein the input transaction corresponds to the selected database element function;
  receiving a return response parameter subsequent to an execution of the input transaction wherein the execution of the input transaction is based on implementation of the selected database element function by the at least one standard smart contract method; and
  wherein the return response parameter is based on the implemented database function element.

In another aspect of the present invention, there is provided a system for structured data management on a blockchain, the system comprising:
  a data processing arrangement including one or more processors configured to:

select, via a user interface, at least one database function element;

receive one or more user inputs consistent with the selected database function;

append, to the blockchain, an input transaction with preconfigured permissions to invoke at least one standard smart contract method on the blockchain wherein the input transaction comprises a first set of parameters corresponding to the one or more user inputs, and wherein the input transaction corresponds to the selected database element function;

receive a return response parameter subsequent to an execution of the input transaction wherein the execution of the input transaction is based on implementation of the selected database element function by the at least one standard smart contract method; and wherein the return response parameter is based on the implemented database function element.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the below-mentioned detailed description and drawings.

OBJECT OF INVENTION

An object of the present invention is to allow structured data management on a blockchain which is not currently provided through conventional existing solutions.

Another object of the present invention is to provide a method to create and add tables to a blockchain and store data in a relational database model.

Another object of the present invention is to provide a method and system for querying selected data from a blockchain which is currently not possible through any of the existing solutions.

BRIEF DESCRIPTION OF DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

It will be appreciated that the drawings illustrated herein are for representative purposes only and do not intend to limit the scope of the present disclosure, and actual implementation of the present disclosure may be viewed substantially differently.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible. The person skilled in the art will recognize many variations, alternatives, and modifications of embodiments of the present disclosure. It shall be understood that this invention is not limited to the particular methodology, protocols, and the like, described herein and as such may vary. The terminology used herein is for the purpose of describing the particular embodiments only and is not intended to limit the scope of the present invention, which is defined solely by the claims.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing the particular embodiments of the aspects described herein, and are not intended to limit the claimed invention, because the scope of the invention is limited only by the claims. Further, unless otherwise required by context, singular terms shall include pluralities and plural terms shall include the singular.

The singular terms "a," "an," and "the" include plural referents unless context clearly indicates otherwise. Similarly, the word "or" is intended to include "and" unless the context clearly indicates otherwise. Thus, for example, references to "the method" includes one or more methods, and/or steps of the type described herein, and/or which will become apparent to those persons skilled in the art upon reading this disclosure and so forth.

Although methods and materials similar or equivalent to those described herein can be used in the practice or testing of this disclosure, suitable methods and materials are described below. The term "comprises" means "includes." The abbreviation, "e.g." is derived from the Latin exempli gratia and is used herein to indicate a non-limiting example. Thus, the abbreviation "e.g." is synonymous with the term "for example."

One or more components of the invention are described as unit for the understanding of the specification. For example, a unit may include self-contained component in a hardware circuit comprising of logical gate, semiconductor device, integrated circuits or any other discrete component. The unit may also be a part of any software programme executed by any hardware entity for example processor. The implementation of unit as a software programme may include a set of logical instructions to be executed by a processor or any other hardware entity.

Additional or less units can be included without deviating from the novel art of this disclosure. In addition, each unit can include any number and combination of sub-units, and systems, implemented with any combination of hardware and/or software units.

Method steps of the invention may be performed by one or more computer processors executing a program tangibly embodied on a computer-readable medium to perform functions of the invention by operating on input and generating output. Suitable processors include, by way of example, both general and special purpose microprocessors.

The present invention claims a system and method of structured data management on a blockchain including creation and management of data repositories for storing data records in a structured manner. Throughout this disclosure, the term "structured data management" refers to creation and storage and retrieval of data in a structure manner. Throughout this disclosure, the term "structured manner" refers to an organised collection of data records with a defined schema. Structured data records enable machines to be able to understand and process information. Storing data records in a structured manner makes it easier to store, query and analyse data records. Furthermore, the term "data records" refers to information stored in a plurality of blocks of the blockchain and includes financial data, sales data, medical data, etc. Such information is added to the said plurality of blocks by means of one or more transactions appended to the plurality of blocks in the blockchain.

Figure 1:
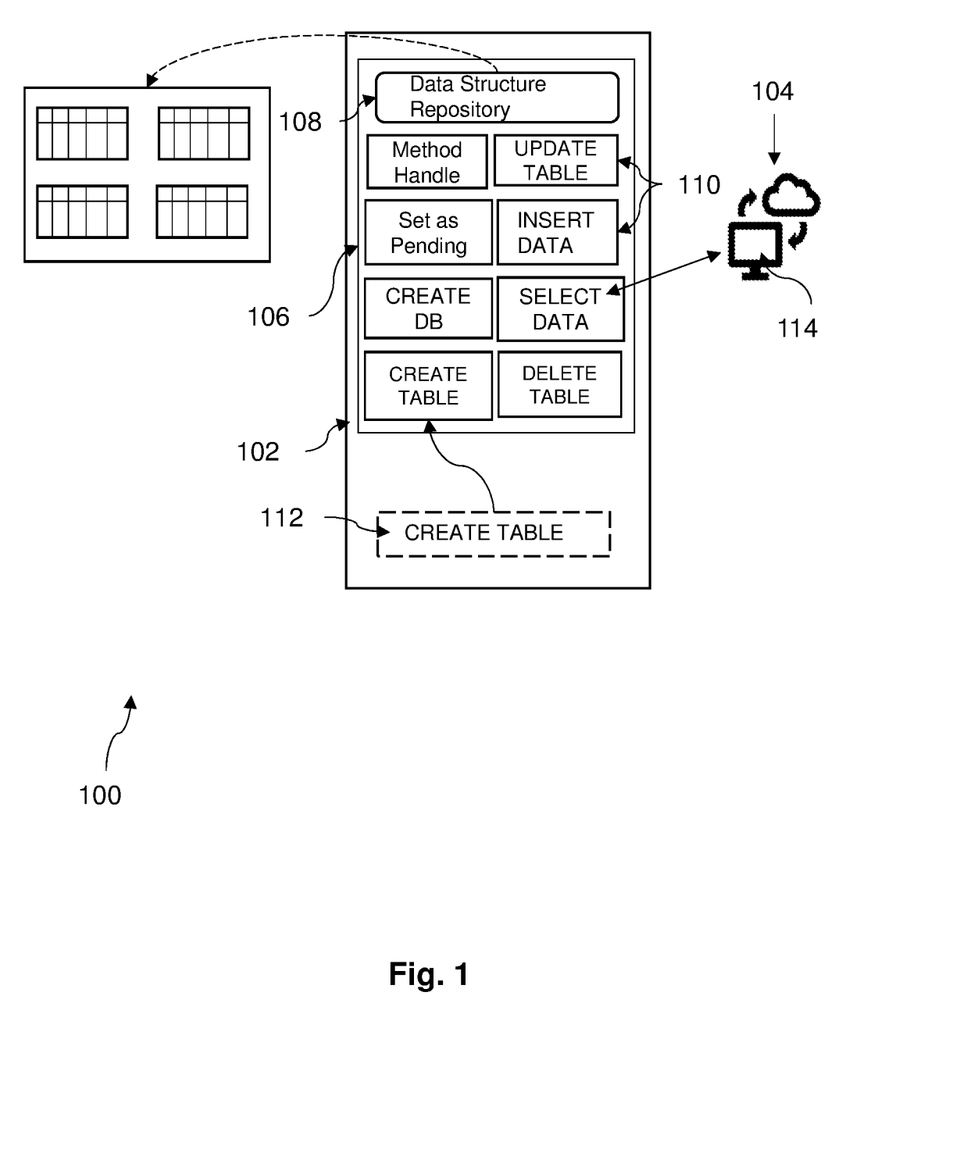
FIG. 1 is a block diagram of the system for creating a table using Create transaction on the blockchain according to an exemplary embodiment of the present disclosure.

FIG. 1. depicts an exemplary system, per the present disclosure, wherein the system 100 comprises a blockchain 102 communicably coupled to a server arrangement 104. The blockchain can be a public blockchain or a private blockchain. Optionally, the blockchain 102 could be permissionless or permissioned. The blockchain 102 is configured to include an initial smart contract 106 wherein the initial smart contract 106 further comprises a data structure repository 108. The initial smart contract 106 further comprises one or more standard smart contract methods 110 with pre-configured permissions wherein each of the standard smart contract methods is a method that, when called, implements at least one database functional element within the data structure repository 108 of the initial smart contract 106.

Throughout this disclosure, the term "initial smart contract" refers to a preconfigured smart contract appended to a blockchain and includes a set of object definitions that are created automatically at the time of deployment of the preconfigured smart contract. The initial smart contract is an essential element for the blockchain communicably coupled to the server arrangement. Any blockchain as per the disclosed system must be deployed the initial smart contract. In an embodiment of the present invention, the initial smart contract is hosted on the blockchain prior to implementation of the system as disclosed. Optionally, the initial smart contract is added, through a programmable web-based API, during operation. The term "smart contract method" refers to set of codes which are used to interrogate a smart contract or change its state. A smart contract can have more than one smart contract methods within it, based on the desired output. Further, the term "standard smart contract method" refers to a default method, within a smart contract, with pre-configured parameters unalterable by any user of the blockchain. Optionally, the standard smart contract method calls can be implemented through one or more smart contract wrappers. An example of said standard smart contract method, as used in the preferred embodiment, is "CREATE TABLE"; "UPDATE TABLE".

A CPU time/RAM or other resources needed to execute the smart contract methods can be acquired prior to addition of the initial smart contract. In some cases, it may be possible to add these resources on the fly. Moreover, the one or more standard methods can be re-configured/fine-tuned later by freezing the block containing the initial smart contract and updating the configurations of the one or more standard methods.

The term "data structure repository" refers to an organized collection of data elements stored inside the smart contract on a blockchain. These data elements can have different types and different lengths. The said data structure repositories can be either linear data structures or hierarchical. As a non-limiting example of such data structure repository, as used in one of the embodiments of the present disclosure, are linked lists and arrays with data elements being stored in the data structure repository in key-value pair format. Furthermore, the term "off-chain data storage medium" refers to any storage of data records which isn't stored on a blockchain. An example of such off-chain storage medium is Enigma, Swarm etc. The blockchain, in such cases, reads the data from third party solutions such as Oracle.

Further, the term "database functional element" refers to one or more database functions that results in storing and managing the data records, in a structured manner, in the data structure repository. The database function element is one of data definition function, data manipulation function or data control function or, transaction control function, with same meaning and function as ascribed to them in respect of a standard SQL database. Non-limiting examples of the said database functional element are Create Table, Update Table, Insert Data, Alter Data, Drop Table etc. It will be appreciated that the database functional element inherently includes one or more data definition language commands and/or data query language command, thereby facilitating storing the data records in structured manner, and querying of data records from data structure repository of the main smart contract. Additionally, the said database functional element refers to parsing distinct values from unstructured data records.

Further, the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as a memory unit, a processor, a network adapter, and the like, to store and process information pertaining to the document and to communicate the processed information to other computing components, for example, such as a client device. Furthermore, the server arrangement comprises a database arrangement for storing data therein.

The server arrangement is communicably coupled via one or more communication networks to the blockchain. The term "one or more communication networks" can be a collection of individual networks, interconnected with each other and functioning as a single large network. Such individual networks may be wired, wireless, or a combination thereof.

Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

The term "user interface" refers to a graphical user interface unit or a command line interface which enables a user to access information stored on the blockchain and/or to store information on the blockchain. The user interface allows addition of one or more transactions to the blockchain and selection and/or input of one or more parameters for the said transactions.

Referring to FIG. 1, a blockchain 102 is communicably coupled to a server arrangement and a user interface 104. The blockchain comprises an initial smart contract 106. The initial smart contract 106 comprises one or more standard smart contract methods 110 wherein each of the standard smart contract method, when called, implements at least one database function element. Non-limiting example of such standard smart contract methods are CREATE DB, CREATE TABLE, ALTER TABLE, DROP TABLE, INSERT TABLE, INSERT DATA, SELECT DATA, UPDATE DATA, DELETE DATA. The user interface 104 enables the user to select from one or more database function elements wherein the one or more database function element allows data records to be stored, managed and retrieved in a structured manner. Based on the selected database function element, the user is prompted to input one or more user inputs consistent with the selected database function element. Each database function element requires a predetermined type of input parameters and shall not be executed if the input parameters are not consistent with the predetermined type. For e.g. an operation of querying of data records, a table name and column values need to be provided. Example of such user inputs are described below.

In an embodiment, a user selects, through the user interface, Data retrieval as a database function element. Based on this user selection, the user is prompted to input name of a table/repository where the data records are stored; field and/or column details of the said table. In another embodiment, a user selects Data addition as a database function element. Based on this user selection, the user is prompted to input the data record, name of a table/repository where the data records are to be stored; field and/or column details of the said table. Further, in another embodiment, the user may provide a smart contract name where the said database function element is to be implemented.

Based on a user selection on the user interface, the server arrangement appends, through a programmable web-based API, an input transaction to the blockchain. Each input transaction corresponds to a transaction type. The input transaction, as used herein, is a transaction added to a blockchain, with preconfigured permissions to invoke at least one standard smart contract method from the initial smart contract on the blockchain. The input transaction further comprises a first set of parameters which are derived from the one or more user inputs and are consistent with the database functional element associated with the transaction type Optionally, the input transaction is comprised of one or more transactions.

Further, the server arrangement stores a transaction index wherein the transaction index comprises a mapping of the user selection and an input transaction. The transaction index lists the one or more user selections available to a user on the user interface. An example user selection could be addition of new data records. Alternatively, a user selection could be retrieval of data records. An example input transaction is Create DB. The Create DB transaction comprises a first set of parameters. The Create DB transaction has preconfigured permissions to invoke CREATE DB( ) standard smart contract method within the initial smart contract method 104 that creates a database inside the data structure repository 108 within the initial smart contract 104. The first set of parameters required by the Create DB ( ) includes inter alia a database schema for the database to be created. Other examples of input transactions are Update, Retrieve etc.

Further, each input transaction is associated with a type identifier wherein the type identifier identifies a function type on a broader level which may further be used to maintain different user roles for accessing and managing data on the created tables/repositories within the smart contract on the blockchain. Example of type identifiers are DDL (Data Definition Language), DML (Data Manipulation Language), DCL (Data Control Language) etc.

Figure 2:
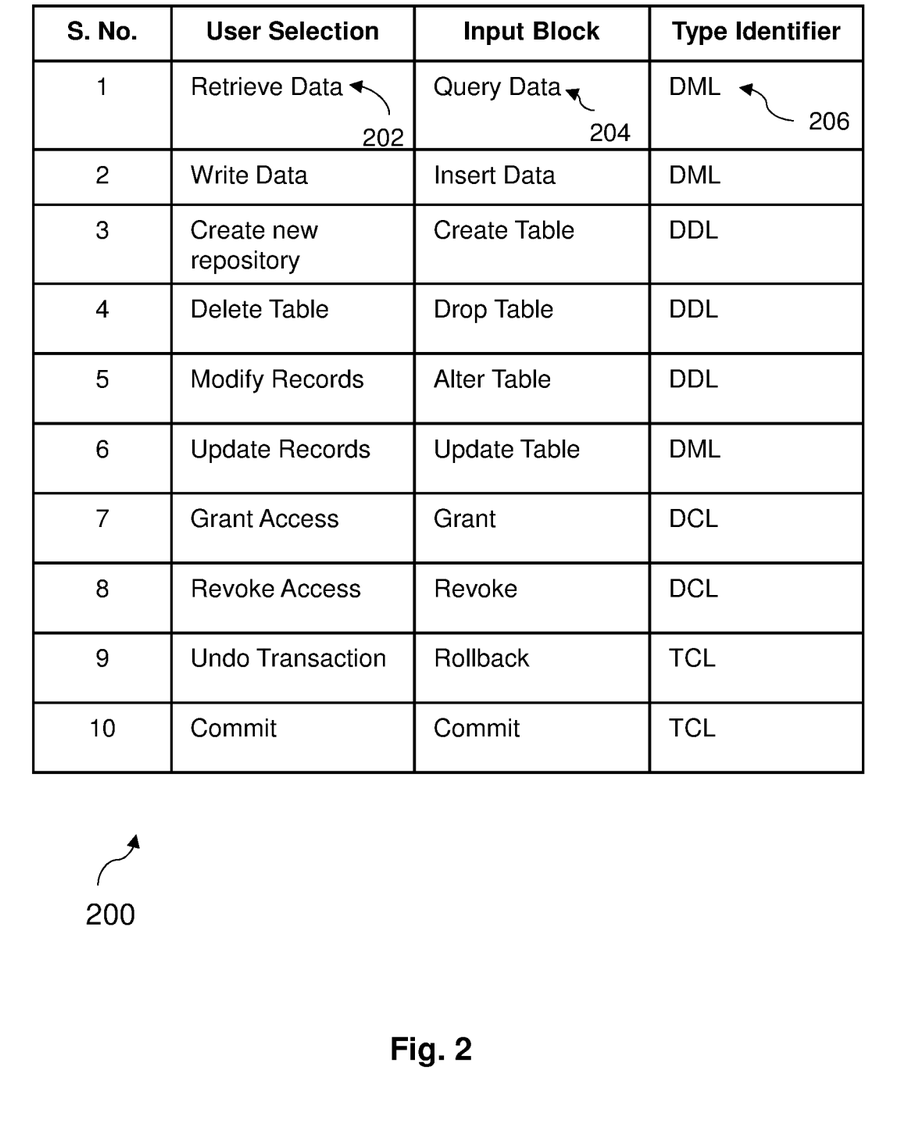
FIG. 2 depicts a transaction index according to an exemplary embodiment of the invention.

FIG. 2 shows an exemplary transaction index 200 wherein one or more user selections are mapped to corresponding input transaction. As stated above, the input transactions have predefined permissions and required set of input parameters required for execution of a standard smart contract method associated with the input transaction. As an example, a user selection Retrieve Data 202 is mapped against input transaction Query Data 204 and has a type identifier DML 206.

The server arrangement is further configured to maintain a privilege level list for users for accessing different input transaction, thereby limiting the type of actions that may be performed by a user on a set of data records in a given table/repository. In an embodiment, the said privilege level list may be a two-level list with privileges granted at global level as well as for each table/repository. In an example embodiment, a user may not be allowed to implement data definition functions which are related to creating table/repositories or deleting tables and may only be allowed to view data records by retrieving them from a given table/repository. Further, a user, based on his/her privilege level, may not be allowed to update the table/repository and hence not allowed to make any changes to the data records of a given table/repository. Further, if a user does not have privilege, at global level, to access DDL type input transaction, then a user will not be able to create new tables/repositories on the blockchain for storing data records.

Figure 3:
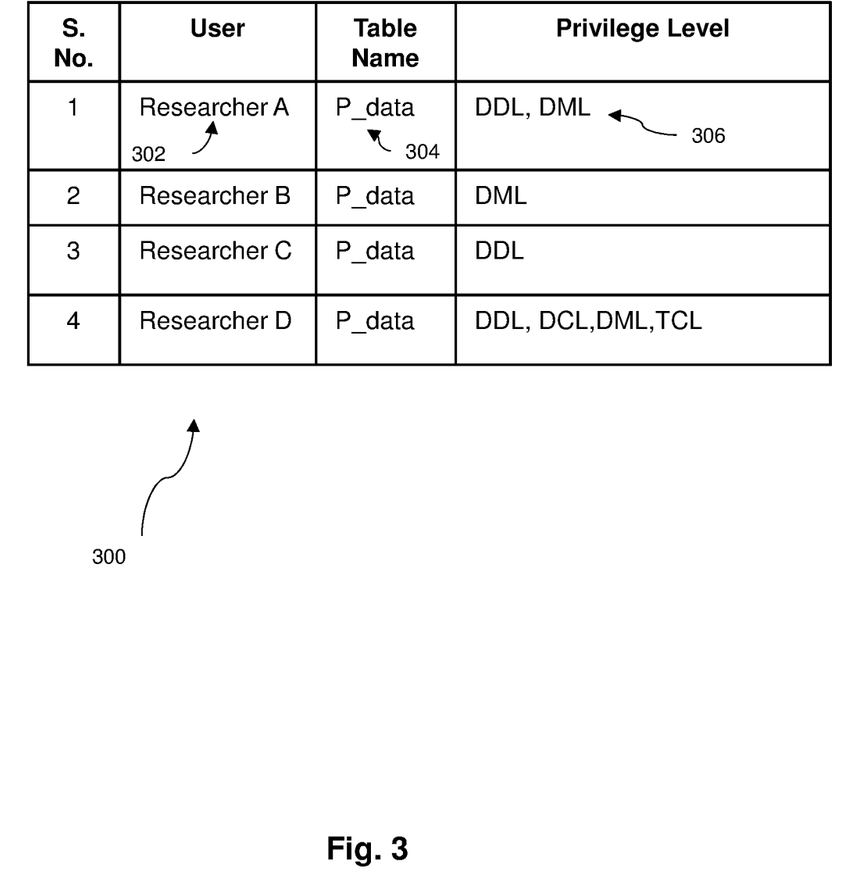
FIG. 3 depicts a privilege level list according to an exemplary embodiment of the invention.

FIG. 3 depicts an exemplary privilege level list 300 maintained by the server arrangement 104 wherein a user Researcher A 302 has privilege 306 of accessing input transactions of type identifier DDL and DML for table/repository P_data 304.

Optionally, the exemplary privilege level list 300 includes one or more smart contract names which are accessible to a user.

In an embodiment, a subject input transaction may be associated with a supplemental transaction apart from the predefined transactions required by a subject input transaction. The supplemental transaction has preconfigured permission to invoke a standard smart contract method, within the initial smart contract, to implement an action, separate from the database function element which the input transaction is configured to implement. In an example embodiment, the action is encryption of data before the same is appended by an input transaction into a table/repository. The supplemental transaction, in this case, include parameters related to encryption key and a type of encryption and a smart contract method name. Similarly, in another embodiment, the action is decryption of data records retrieved by the input transaction. The supplemental transaction, in this case, include parameters related to decryption key and a smart contract method name.

Figure 4:
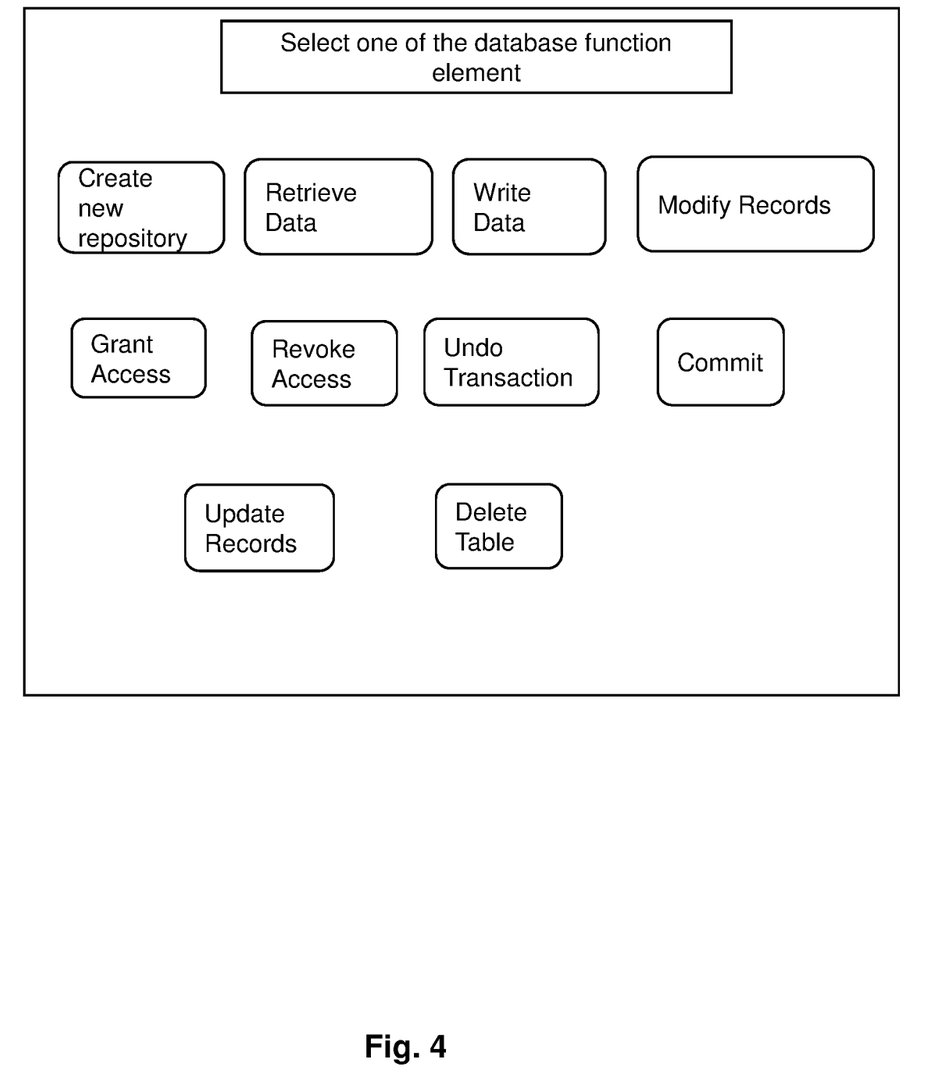
FIG. 4 depicts a sample user interface as per an exemplary embodiment of the invention.

In an exemplary embodiment, the user interface 108 is a graphical user interface implementing a web-based application or mobile based application that allows the user to select a database functional element. In an alternate embodiment, third party extensions on the server arrangement 102 allowing addition of the one or more transactions to the blockchain are used. FIG. 4 depicts a sample user interface with plurality of database function elements to select from. Based on a selection of database function element, an input transaction to be appended to the blockchain is identified in order to implement the database function element.

The server arrangement is further configured to receive a return response parameter consequent to the execution of the input transaction. The return response parameter is based on the database function element implemented by the standard smart contract method invoked by the input transaction. In an example embodiment, the return response parameters are one or more data records from a particular table wherein the input transaction appended is Select Data and the implemented database function element is retrieval of data records. Optionally, the return response parameter in case of input transaction Insert Data is a Boolean entry of either True or false indicating whether the data records have been successfully inserted into the designated table/repository. Beneficially, the type of return response parameter is predefined for each of the input transaction.

FIG. 1 depicts the disclosed system 100 in operation. In operation, as per the present invention, a user intending to create a new table for storing data records selects, on the user interface, a database function element of Creating table for storing one or more data records. Consequently, the server arrangement determines, from the transaction index, an input transaction corresponding to the user selection. Further, the server arrangement identifies a type identifier for the input transaction. The server arrangement further checks for a privilege level associated with the user and determines whether the user is allowed to implement the selected database function element. In the present example, the server arrangement determines, based on the user selection, the input transaction as Create Table and further identifies, from the privilege level list, that the user is allowed to implement data definition functions. Subsequent to identification of valid privilege levels, the user is prompted to input one or more user inputs related to the selected database functional element. The one or more user inputs includes information pertaining a structure of the new table, field names and data types which essentially define a schema for the table to created.

In the exemplary embodiment described above, an input transaction 108 i.e. Create Table with preconfigured permissions and a first set of parameters for creating a new table is added to the blockchain through the programmable web-based API. The first set of parameters for Create Table input transaction are the one or more user inputs entered by the user which are then passed, after appending of Create Table transaction, to the CREATE TABLE standard smart contract method 106 within the initial smart contract. The first set of parameters for Create Table, as per the exemplary embodiment, are <table-name> <Field-Name1> <data-type1> not null; The preconfigured permission of the input transaction includes a trigger command to be passed to the CREATE TABLE( ) standard smart contract method 106, in the initial smart contract 104, for invoking said standard smart contract method. This creates a class definition using dynamic class loading. Class name and its fields would be defined as per the first set of parameters passed during the invocation of the standard smart contract method. This will create the meta data. Memory would be allocated to create a linked list of structure as per the class definition in the metadata. List would be such that each element of the linked list would represent a row in the table.

In response to the execution of the CREATE TABLE standard smart contract method 106, a table containing rows and columns is created inside the top-level data structure of the initial smart contract 105 and an information pertaining to successful execution of the method is added to the appended Create Table transaction. The server arrangement receives a return response parameter which, in the above exemplary embodiment, is a Boolean True since the table is successfully created. Otherwise, the return response parameter is a Boolean False if the table is not created.

Optionally, a user intending to write one or more data records into an existing table selects, on the user interface, a database function element of Write Data for inserting the one or more data records. Consequently, the server arrangement determines, from the transaction index, an input transaction corresponding to the user selection. Further, the server arrangement identifies a type identifier for the input transaction. The server arrangement further checks for a privilege level associated with the user and determines whether the user is allowed to implement the selected database function element. In the present example, the server arrangement determines, based on the user selection, the input transaction as Insert Data and further identifies, from the privilege level list, that the user is allowed to implement Data Manipulation functions. Subsequent to identification of valid privilege levels, the user is prompted to input one or more user inputs related to the selected database functional element. The one or more user inputs includes information pertaining to a table name (in which data records are to be added), field names and a data type for the one or more data records to be inserted.

In the exemplary embodiment described above, an input transaction 108 i.e. Insert Data with preconfigured permissions and a first set of parameters for inserting data into a table is added to the blockchain. The first set of parameters for Insert Data input transaction are the one or more user inputs entered by the user which are then passed, after appending of Insert Data block, to the INSERT DATA( ) standard smart contract method 106 within the initial smart contract. The first set of parameters for Insert Data, as per the exemplary embodiment, are Table Name (field1, field2) TYPE (int) VALUES (val1, val2); The preconfigured permission of the input transaction includes a trigger command to be passed to the INSERT DATA standard smart contract method 106, in the initial smart contract 104, for invoking said standard smart contract method. Memory would be re-allocated to the linked-list structure created at the time of Create Table( ) invocation. For the row to be added, an instance of class (related to the table) would be created and values would be populated. This object would then be added an element to the linked list.

In response to the execution of the INSERT DATA standard smart contract method 106, one or more data records are inserted into the desired fields of the said table name and an information pertaining to successful execution of the method is added to the appended Insert Data block. The server arrangement receives a return response parameter which, in the above example embodiment, is a Boolean True since the one or more data records are successfully inserted. Otherwise, the return response parameter is a Boolean False if the one or more data records are not inserted into the table successfully.

Optionally, a user intending to query one or more data records from an existing table selects, on the user interface, a database function element of Retrieve Data for retrieving the one or more data records. Consequently, the server arrangement determines, from the transaction index, an input transaction corresponding to the user selection. Further, the server arrangement identifies a type identifier for the input transaction. The server arrangement further checks for a privilege level associated with the user and determines whether the user is allowed to implement the selected database function element. In the present example, the server arrangement determines, based on the user selection, the input transaction as Query Data and further identifies, from the privilege level list, that the user is allowed to implement Data Manipulation functions. Subsequent to identification of valid privilege levels, the user is prompted to input one or more user inputs related to the selected database functional element. The one or more user inputs includes information pertaining to a table name and one or more field names of the table from which the one or more data records are to be retrieved.

In the exemplary embodiment described above, an input transaction 108 i.e. Query Data with preconfigured permissions and a first set of parameters for retrieving data records from a table is added to the blockchain. The first set of parameters for Query Data input transaction are the one or more user inputs entered by the user which are then passed, after appending of Insert Data transaction, to the SELECT DATA standard smart contract method 106 within the initial smart contract. The first set of parameters for Query Data, as per the exemplary embodiment, are <field> where column-name=<value> from <table-name>. The preconfigured permission of the input transaction includes a trigger command to be passed to the SELECT DATA standard smart contract method 106, in the initial smart contract 104, for execution of said standard smart contract method. For the rows to be selected, an instance of class (related to the table) would be created and field values would be populated.

In response to the execution of the SELECT DATA standard smart contract method 106, one or more data records are retrieved and added to the appended Query Data transaction along with and an information pertaining to successful execution of the method. The server arrangement receives a return response parameter which, in the above example embodiment, are key value pairs for the retrieved data records. Alternatively, optionally, the return response parameters could be specific field values in a user defined formats wherein the user defined formats are passed on along with the first set of parameters for the predefined input block. Alternatively, optionally, the selected data records can be fetched outside the blockchain using an API access to the query transaction.

Similar to above described operations, Create DB input transaction may be appended that have preconfigured permissions to create a data structure repository within the initial smart contract. Create DB input transaction is used to define a nature of the database that would be created within the initial smart contract. As a non-limiting example, the database could be a relational database, NoSQL database, non-relational databases.

In an aspect of the present invention, Joins, between tables within the data structure repository, can be supported through methods that can traverse through multiple linked lists and manipulate the linked list nodes. Metadata and linked lists would be part of the data repository of the smart contract.

Figure 5:
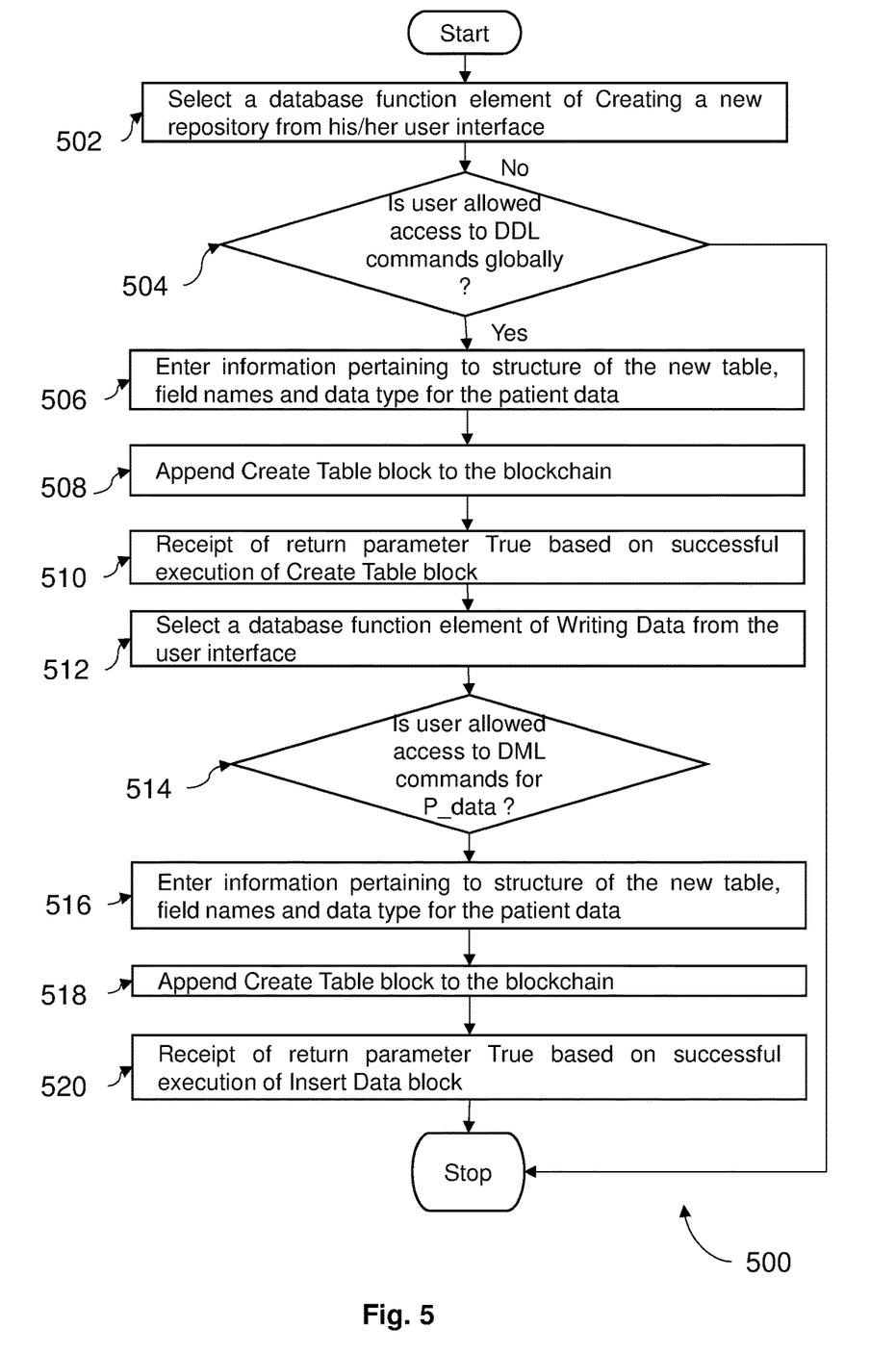
FIG. 5 illustrates a flow chart describing the process of data upload by a researcher.

In an example embodiment, a public blockchain 102 with an initial smart contract 106 is provided wherein the public blockchain is communicably coupled to a server arrangement 104. One or more users are connected, through their respective user interfaces, to the server arrangement 104 over a data communication network. Researcher A intends to upload and share his work, related to patient data, securely to his peers. FIG. 5 illustrates a flow chart describing the process 500 of data upload by the researcher A. At step 502, Researcher A selects a database function element of Creating a new repository from his/her user interface. At 504, the server arrangement verifies the researcher's credentials and a privilege level associated with the researcher. At 506, based on the valid privilege levels, the researcher is prompted for one or more user inputs which primarily relate to information pertaining to structure of the new table, field names and data type for the patient data. At 508, a Create table transaction is appended to the blockchain with a first set of parameters as follows:

<P_data> <S.No> <int> not null;
<P_data> <Name> < str> not null;
<P_data> <Disease> < str> not null;

The Create table transaction is executed to invoke CREATE TABLE( ) standard smart contract method in the initial smart contract method which results in creation of a table with the name P_data in the top-level data structure of the initial smart contract which has 3 columns namely, S.No, Name and Disease.

Subsequent to the receipt of the return response parameter True, at 510, indicating the successful execution of Create Table input transaction, Researcher A proceeds to add one or more data records to the created table P_data. At The researcher, at 512, selects the database functional element of Writing Data from the user interface. The server arrangement, at 514, verifies the researcher's credentials and a privilege level associated with the researcher. Based on the valid privilege levels, the researcher is prompted, at 516, for one or more user inputs which primarily relate to information pertaining to the table name (in which data records are to be added), field names and a data type for the one or more data records to be inserted. The researcher inputs the patient data that needs to be inserted into the table. Subsequently, at

518, an input transaction Insert Data is appended to the blockchain with a first set of parameters as follows:

```
P_data (S.No., Name, Disease) VALUES (1, Ashok, Diabetes);
P_data (S.No., Name, Disease) VALUES (2, Rahul, Cancer);
P_data (S.No., Name, Disease) VALUES (3, Mirtosh, Cancer);
```

The Insert Data input transaction is executed to invoke INSERT DATA( ) standard smart contract method in the initial smart contract method which results in insertion of said data records into the table P_data. A return response parameter True is received by, at 520, the researcher A indicating successful insertion of the said data records into the table P-data.

Figure 6:
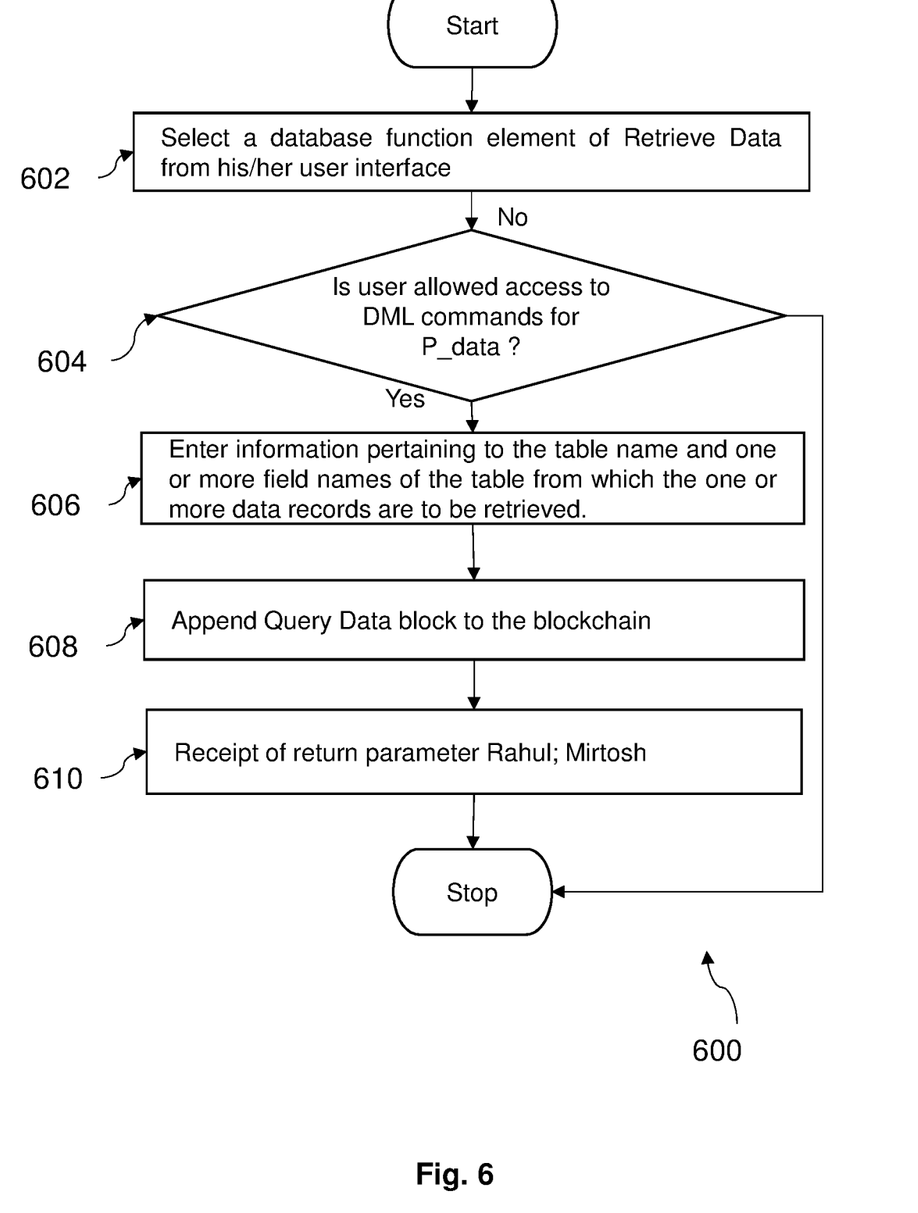
FIG. 6 depicts a flow chart describing the process of data retrieval by a researcher.

Optionally, another researcher B, part of the plurality of users, is interested in accessing A's work and intends to retrieve names of patients who are diagnosed with cancer. FIG. 6 depicts a flow chart describing the process of data retrieval 600 by a researcher. Researcher B, using his/her user interface, at 602 selects a database function element of Retrieve Data. At 604, the server arrangement verifies the researcher B's credentials and a privilege level associated with the Researcher B to determine whether B is allowed to access the requested data records from the table P_data. Based on the valid privilege levels, at 606 Researcher B is prompted for one or more user inputs which primarily relate to information pertaining to the table name and one or more field names of the table from which the one or more data records are to be retrieved.

Subsequently, at 608, an input transaction Query Data is appended to the blockchain with a first set of parameters as follows:

```
SELECT Name where Disease = <Cancer>
       from <P_data>
```

The input transaction Query Data is executed to invoke SELECT DATA( ) standard smart contract method in the initial smart contract method. A return response parameter Rahul; Mirtosh is appended to the Query Data input transaction along with a Boolean Response True indicating successful execution of the input transaction Query Data. Researcher B, at 610, receives the names of patients diagnosed with cancer which are Rahul and Mirtosh.

Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions.

It will be appreciated that features of the present disclosure are susceptible to being combined in various combinations and additional features may be introduced without departing from the scope of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of structured data management on a blockchain, the method comprising:
    selecting, via a user interface, at least one database function element;
    receiving, via the user interface, one or more user inputs consistent with the selected database function;
    appending, to the blockchain, an input transaction with preconfigured permissions, that causes execution of at least one standard smart contract method on the blockchain wherein the execution of the at least one standard smart contract method corresponds to a first action that corresponds to the selected database element function, wherein the input transaction comprises a first set of parameters corresponding to the one or more user inputs, wherein the input transaction to be appended to the blockchain is determined based on a transaction index wherein the transaction index comprises a mapping of a user selection and the input transaction;
    appending, concurrently, to the blockchain, at least one supplemental transaction with the input transaction, wherein
        the at least one supplemental transaction, with preconfigured permissions, causes execution of a specific standard smart contract method which corresponds to a second action that is different from the first action, and
        the appended at least one supplemental transaction is associated with the appended input transaction; and
    receiving a return response parameter subsequent to an execution of the input transaction wherein the execution of the input transaction is based on implementation of the selected database function element by the at least one standard smart contract method;
    wherein the return response parameter is based on the implemented database function element.

2. The method of claim 1, wherein the blockchain comprises an initial smart contract, the initial smart contract further comprising one or more standard smart contract methods for implementing one or more database function elements in a data structure repository within the initial smart contract.

3. The method of claim 1, wherein the each of standard smart contract method in the initial smart contract corresponds to at least one database function element.

4. The method of claim 1, wherein the database function element is one of data definition, data manipulation or data control or, transaction control function, as implemented in a standard SQL database.

5. The method of claim 1, wherein each input transaction is associated with at least one set of parameters wherein the at least one set of parameters are based on the database function element.

6. The method of claim 1, wherein the action is one of encryption of data or decryption of data records.

7. The method of claim 1, wherein the appending an input transaction to the blockchain is based on a valid privilege level associated with a user.

8. The method of claim 1, wherein the return response parameter is one or more data records stored in a table within the data structure repository.

9. A system for structured data management on a blockchain, the system comprising:
 a data processing arrangement including one or more processors configured to:
  select, via a user interface, at least one database function element;
  receive one or more user inputs consistent with the selected database function;
  append, to the blockchain, an input transaction with preconfigured permissions that causes execution of at least one standard smart contract method on the blockchain wherein the execution of the at least one standard smart contract method corresponds to a first action that corresponds to the selected database element function, wherein the input transaction comprises a first set of parameters corresponding to the one or more user inputs, wherein the input transaction to be appended to the blockchain is determined based on a transaction index wherein the transaction index comprises a mapping of a user selection and the input transaction;
 append, concurrently, to the blockchain, at least one supplemental transaction with the input transaction, wherein
  the at least one supplemental transaction, with preconfigured permissions, causes execution of a specific standard smart contract method which corresponds to a second action that is different from the first action, and
  the appended at least one supplemental transaction is associated with the appended input transaction; and
 receive a return response parameter subsequent to an execution of the input transaction wherein the execution of the input transaction is based on implementation of the selected database element function by the at least one standard smart contract method;
 wherein the return response parameter is based on the implemented database function element.

10. The system of claim 9, wherein the blockchain comprises an initial smart contract, the initial smart contract further comprising one or more standard smart contract methods for implementing one or more database function elements in a data structure repository within the initial smart contract.

11. The system of claim 9, wherein the each of standard smart contract method in the initial smart contract corresponds to at least one database function element.

12. The system of claim 9, wherein the database function element is one of data definition, data manipulation or data control or, transaction control function, as implemented in a standard SQL database.

13. The system of claim 9, wherein each input transaction is associated with at least one set of parameters wherein the at least one set of parameters are based on the database function element.

14. The system of claim 9, wherein the action is one of encryption of data or decryption of data records.

15. The system of claim 9, wherein the appending an input transaction to the blockchain is based on a valid privilege level associated with a user.

16. The system of claim 9, wherein the return response parameter is one or more data records stored in table within the data structure repository.

* * * * *